US012736478B2

(12) United States Patent
Song

(10) Patent No.: US 12,736,478 B2
(45) Date of Patent: Sep. 15, 2026

(54) LASER INSPECTION SYSTEM AND INSPECTION METHOD USING THE SAME

(71) Applicant: Samsung Display Co., LTD., Yongin-si (KR)

(72) Inventor: Seungmin Song, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 175 days.

(21) Appl. No.: 18/223,616

(22) Filed: Jul. 19, 2023

(65) Prior Publication Data

US 2024/0094135 A1 Mar. 21, 2024

(30) Foreign Application Priority Data

Sep. 20, 2022 (KR) ........................ 10-2022-0118486

(51) Int. Cl.
*G01N 21/88* (2006.01)
*G01N 21/47* (2006.01)

(52) U.S. Cl.
CPC ............. *G01N 21/88* (2013.01); *G01N 21/47* (2013.01); *G01N 2201/06113* (2013.01)

(58) Field of Classification Search
CPC ........... G01N 2021/9513; G01N 21/47; G01N 21/88; G01N 21/8806; G01N 2201/06113; G01N 2021/8438; G01N 2021/8816; G01N 2021/8835; G01N 2021/8858; G01N 21/17; G01N 21/84; G01N 21/95; G01N 2201/104; B60W 2040/0863; B60W 2040/0872; B60W 2050/0064; B60W 2420/403; B60W 2420/408; B60W 2520/00; B60W 2540/30; B60W 2554/80; B60W 30/08; B60W 40/02; B60W 40/08; B60W 50/00; B60W 50/0098; B60W 60/0016; B60W 60/005; B60W 60/0051; B60W 60/0059; B60W 60/007; G01B 11/028; G02F 1/1309; G05D 1/0011
See application file for complete search history.

(56) References Cited

U.S. PATENT DOCUMENTS

2022/0187057 A1* 6/2022 Meeks ................. G01B 11/065

FOREIGN PATENT DOCUMENTS

CN 103443612 B * 4/2016 .......... A47L 11/4008
JP H07248212 A * 9/1995

(Continued)

*Primary Examiner* — Tri T Ton
(74) *Attorney, Agent, or Firm* — CANTOR COLBURN LLP

(57) ABSTRACT

A laser inspection system includes a stage including a top surface parallel to a plane defined by a first direction and a second direction intersecting the first direction, a first laser unit spaced apart from the stage in a third direction perpendicular to the plane, where the first laser unit emits a first laser beam proceeding in a direction parallel to the plane, a second laser unit spaced apart from the first laser unit in the third direction, where the second laser unit emits a second laser beam proceeding in a direction parallel to a proceeding direction of the first laser beam, and an inspection object spaced apart from the first laser unit in the first direction on the top surface of the stage, where the inspection object has a maximum allowable specification and a minimum allowable specification in the third direction from the top surface of the stage.

17 Claims, 12 Drawing Sheets

(56) References Cited

FOREIGN PATENT DOCUMENTS

| | | | | | |
|---|---|---|---|---|---|
| JP | 2013505465 A | * | 2/2013 | ......... | G01N 21/8903 |
| JP | 5289144 B2 | | 6/2013 | | |
| JP | 5271908 B2 | * | 8/2013 | ............. | G01B 11/06 |
| JP | 2022017068 A | | 1/2022 | | |
| KR | 102201767 B1 | | 1/2021 | | |

* cited by examiner

LASER INSPECTION SYSTEM AND INSPECTION METHOD USING THE SAME

This application claims priority to Korean Patent Application No. 10-2022-0118486, filed on Sep. 20, 2022, and all the benefits accruing therefrom under 35 U.S.C. § 119, the content of which in its entirety is herein incorporated by reference.

BACKGROUND

1. Field

Embodiments relate to an inspection system and an inspection method using the inspection system. More particularly, embodiments relate to an inspection system using a laser and an inspection method using the inspection system.

2. Description of the Related Art

Due to lightweight and thin features or the like, a flat panel display is used as a display device to replace a cathode ray tube display device. Such flat panel display devices may include a liquid crystal display device and an organic light emitting display device, for example.

A display device may include a plurality of layers. During a manufacturing process of the display device, a defect may occur in the layers. Accordingly, various inspection systems for inspecting whether a display device is defective have been developed.

SUMMARY

Embodiments provide a laser inspection system in which inspection time is reduced and inspection efficiency is improved.

Embodiments provide an inspection method using the laser inspection system.

A laser inspection system according to an embodiment includes a stage including a top surface parallel to a plane defined by a first direction and a second direction intersecting the first direction, a first laser unit spaced apart from the stage in a third direction perpendicular to the plane, where the first laser unit emits a first laser beam proceeding in a direction parallel to the plane, a second laser unit spaced apart from the first laser unit in the third direction directed to the first laser unit from the stage, where the second laser unit emits a second laser beam proceeding in a direction parallel to a proceeding direction of the first laser beam, and an inspection object spaced apart from the first laser unit in the first direction on the top surface of the stage, where the inspection object has a maximum allowable specification and a minimum allowable specification in the third direction from the top surface of the stage.

In an embodiment, the first laser beam may be radiated to a position of the minimum allowable specification of the inspection object, and the second laser beam may be irradiated to a position of the maximum allowable specification of the inspection object.

In an embodiment, the laser inspection system may further include a detector spaced apart from the stage in the third direction.

In an embodiment, the detector may include a first detector spaced apart from the stage in the third direction, and a second detector spaced apart from the first detector in the third direction.

In an embodiment, the inspection object may be disposed between the first laser unit and the first detector.

In an embodiment, when a height of the inspection object from the top surface of the stage is greater than or equal to the minimum allowable specification, the first detector may detect the first laser beam reflected or scattered from the inspection object.

In an embodiment, when a height of the inspection object from the top surface of the stage is greater than or equal to the maximum allowable specification, the second detector may detect the second laser beam reflected or scattered from the inspection object.

In an embodiment, the first laser unit and the second laser unit may simultaneously emit the first laser beam and the second laser beam, respectively.

In an embodiment, each of the first laser unit and the second laser unit may include a light source and a laser slitter.

In an embodiment, the first laser beam and the second laser beam may have different colors from each other.

A laser inspection system according to an embodiment includes a stage including a top surface parallel to a plane defined by a first direction and a second direction intersecting the first direction, a laser unit spaced apart from the stage in a third direction perpendicular to the plane, where the laser unit emits a laser beam proceeding in a direction parallel to the plane, and an inspection object spaced apart from the laser unit in the first direction on the top surface of the stage, where the inspection object has a maximum allowable specification and a minimum allowable specification in the third direction from the top surface of the stage.

In an embodiment, the laser beam may be radiated to a position of the minimum allowable specification of the inspection object.

In an embodiment, the laser beam may be radiated to a position of the maximum allowable specification of the inspection object.

In an embodiment, the laser inspection system may further include a detector spaced apart from the stage in the third direction.

A laser inspection method according to an embodiment includes preparing for a first laser unit which emits a first laser beam, a second laser unit spaced apart from the first laser unit and which emits a second laser beam, a first detector which detects the first laser beam, a second detector spaced apart from the first detector and which detects the second laser beam, and an inspection object disposed between the first laser unit and the first detector and having a maximum allowable specification and a minimum allowable specification, radiating the first laser beam to a position of the minimum allowable specification of the inspection object, radiating the second laser beam to a position of the maximum allowable specification of the inspection object, detecting the first laser beam reflected or scattered from the inspection object by the first detector, detecting the second laser beam reflected or scattered from the inspection object by the second detector, and determining whether the inspection object has a specification defect based on the first laser beam and the second laser beam which are detected by the first detector and the second detector.

In an embodiment, the determining whether the inspection object has the specification defect may include determining the inspection object as a defective product when the second detector detects the second laser beam reflected or scattered from the inspection object.

In an embodiment, the determining whether the inspection object has the specification defect may include determining the inspection object as a normal product when the first detector detects the first laser beam reflected or scattered from the inspection object.

In an embodiment, the radiating the first laser beam to the position of the minimum allowable specification of the inspection object, and the radiating the second laser beam to the maximum allowable specification position of the inspection object may be simultaneously performed.

In an embodiment, each of the first laser beam and the second laser beam may be radiated perpendicularly to the inspection object or an extension line of the inspection object.

In an embodiment, each of the first laser unit and the second laser unit may include a light source and a laser slitter.

In a laser inspection system according to embodiments of the disclosure, a first laser beam emitted from a first laser unit may be radiated to a position corresponding to a minimum allowable specification, and a second laser beam emitted from a second laser unit may be radiated to a position corresponding to a maximum allowable specification. In such embodiments, a defect in specification may be immediately checked depending on whether the first and second laser beams are reflected or scattered from an inspection object, such that inspection efficiency may be improved. Accordingly, since logistics may be automated, errors may be reduced, so that yield may be increased, and inspection time may be shortened. In such embodiments, a specification distribution and a specification center may be adjusted by arranging each of the first and second laser units, so that the process capability may be easily managed.

DETAILED DESCRIPTION

Figure 1:
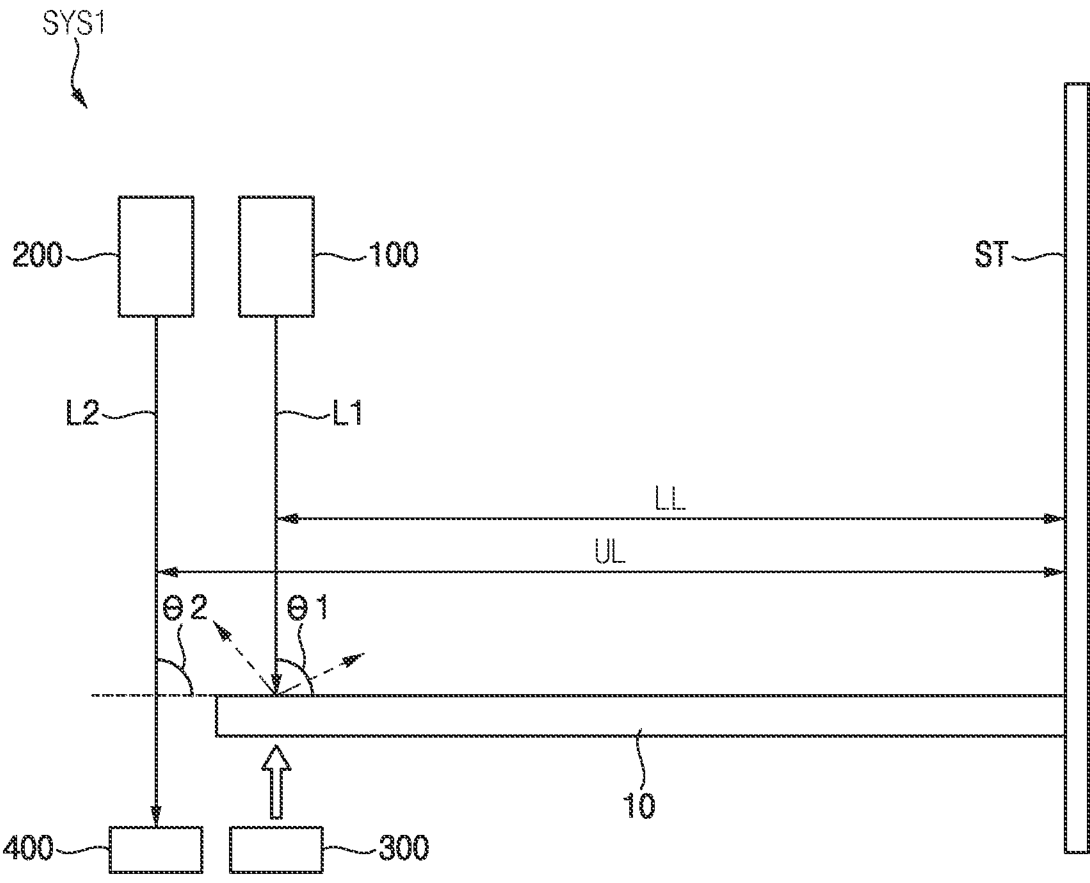
FIGS. 1 and 2 are views showing a laser inspection system according to an embodiment of the disclosure.
Figure 1:
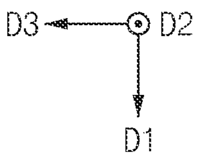

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the embodiments of the disclosure will be described in more detail with reference to the accompanying drawings. The same reference numerals are used for the same components in the drawings, and any repetitive detailed descriptions of the same components will be omitted or simplified.

Figure 2:
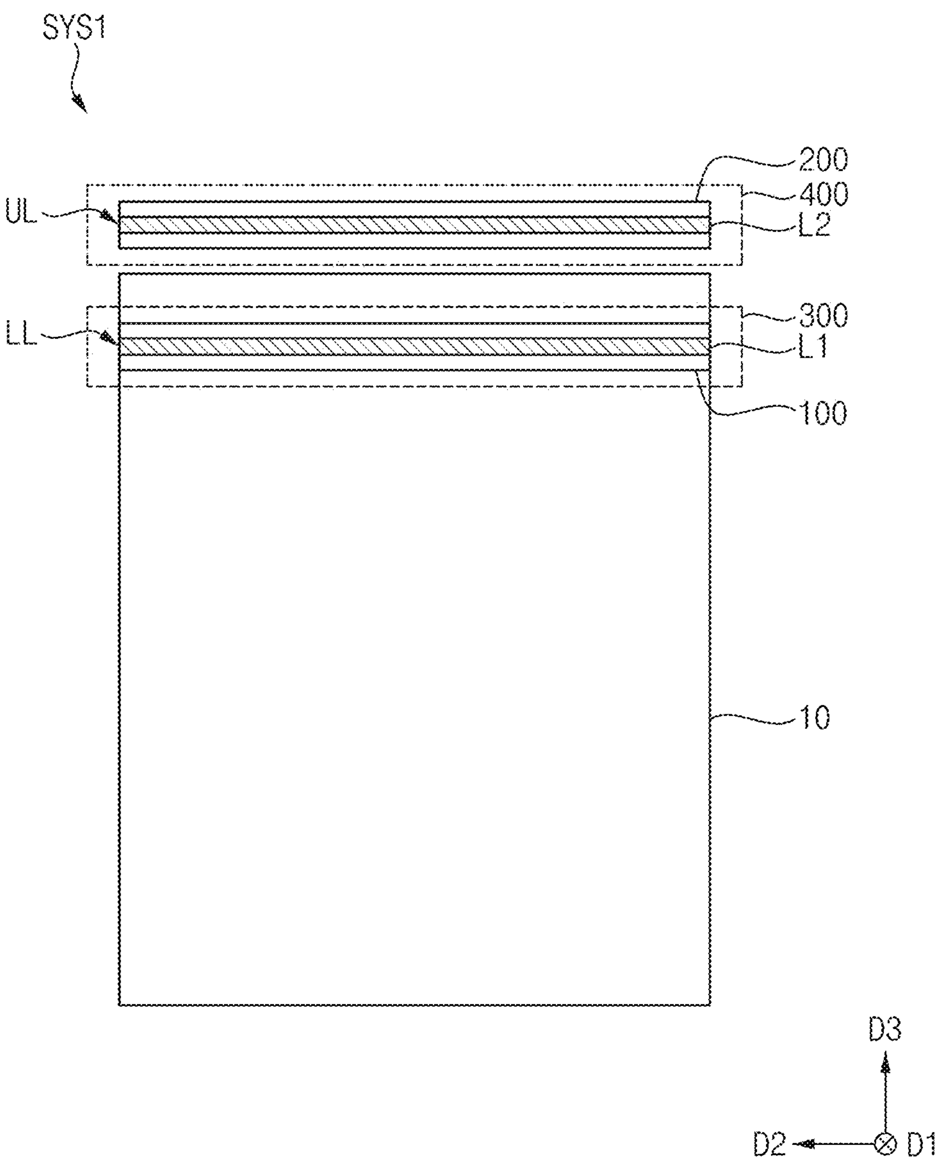

FIGS. 1 and 2 are views showing a laser inspection system according to an embodiment of the disclosure.

Referring to FIGS. 1 and 2, an embodiment of a laser inspection system SYS1 may include a stage ST, a first laser unit 100, a second laser unit 200, a first detector 300, a second detector 400, and an inspection object 10.

The stage ST may include a top surface parallel to a plane defined by a first direction D1 and a second direction D2 intersecting the first direction D1. In an embodiment, for example, the first direction D1 and the second direction D2 may be perpendicular to each other.

The first laser unit 100 may be spaced apart from the stage ST in a third direction D3. The third direction D3 may be perpendicular to each of the first and second directions D1 and D2. The first laser unit 100 may emit a first laser beam L1 proceeding in a direction parallel to the plane. In an embodiment, for example, the first laser beam L1 may proceed in the first direction D1. In an embodiment, the first laser beam L1 may be a laser slit light in a form of a straight line (or a slit laser beam).

The second laser unit 200 may be spaced apart from the first laser unit 100 in the third direction D3. In an embodiment, the second laser unit 200 may be spaced apart from the first laser unit 100 in the third direction D3 directed to the first laser unit 100 from the stage ST. The second laser unit 200 may emit a second laser beam L2 proceeding in a direction parallel to the proceeding direction of the first laser beam L1. In an embodiment, for example, the second laser beam L2 may proceed in the first direction D1. In an embodiment, the second laser beam L2 may be a laser slit light in a form of a straight line. In an embodiment, the first laser beam L1 and the second laser beam L2 may have different colors (or be in different wavelength ranges) from each other.

The first detector 300 may be spaced apart from the stage ST in the third direction D3. In addition, the first detector 300 may be spaced apart from the first laser unit 100 in the first direction D1. In such an embodiment, the first detector 300 may be disposed on the proceeding direction of the first laser beam L1. In an embodiment, the first detector 300 may detect a reflected or scattered first laser beam L1.

The second detector 400 may be spaced apart from the first detector 300 in the third direction D3. In addition, the second detector 400 may be spaced apart from the second laser unit 200 in the first direction D1. In such an embodiment, the second detector 400 may be disposed on the proceeding direction of the second laser beam L2. In an embodiment, the second detector 400 may detect a reflected or scattered second laser beam L2.

The inspection object 10 may be fixed onto a top surface of the stage ST. In an embodiment, the inspection object 10 may be disposed on the top surface of the stage ST while being spaced apart from the first laser unit 100 in the first direction D1, and may be disposed between the first laser unit 100 and the first detector 300.

In an embodiment, as shown in FIG. 2, the inspection object 10 may have a minimum allowable specification LL and a maximum allowable specification UL. In an embodiment, a specification of the inspection object 10 may be defined as a height of the inspection object 10 in the third direction D3 from the top surface of the stage ST. In such an embodiment, the minimum allowable specification LL may be defined as a minimum allowable height of the inspection object 10 from the top surface of the stage ST in the third direction D3, and the maximum allowable specification UL may be defined as a maximum allowable height of the inspection object 10 from the top surface of the stage ST in the third direction D3. In an embodiment, for example, the inspection object 10 may be a cover glass.

Due to an error and the like in a process of manufacturing the inspection object 10, the inspection object 10 may have various specifications or specifications that are not identical to each other. In this case, it is desired to select the inspection object 10 having a specification between the minimum allowable specification LL and the maximum allowable specification UL. in an embodiment, when the inspection object 10 has a specification between the minimum allowable specification LL and the maximum allowable specification UL, the inspection object 10 may be determined as a good (or normal) product. However, when the inspection object 10 has a specification smaller than the minimum allowable specification LL, or the inspection object 10 has a specification greater than the maximum allowable specification UL, the inspection object 10 may be determined as a defective product.

In an embodiment, the first laser beam L1 may be radiated to a position of (or a position corresponding to) the minimum allowable specification LL of the inspection object 10, and the second laser beam L2 may be radiated to a position of (or a position corresponding to) the maximum allowable specification UL of the inspection object 10 to determine whether the inspection object 10 has a specification between the minimum allowable specification LL and the maximum allowable specification UL. In such an embodiment, the first laser beam L1 and the second laser beam L2 may be simultaneously emitted from the first laser unit 100 and the second laser unit 200, respectively.

The first laser beam L1 may be radiated while having a first angle θ1 with respect to the inspection object 10. In an embodiment, for example, the first laser beam L1 may be radiated perpendicularly to the inspection object 10. In such an embodiment, the first angle θ1 may be about 90°.

The second laser beam L2 may be radiated while having a second angle θ2 with respect to an extension line of the inspection object 10 in the third direction D3. In an embodiment, for example, the second laser beam L2 may be radiated perpendicularly to the extension line of the inspection object 10. In such an embodiment, the second angle θ2 may be about 90°.

In an embodiment, when the inspection object 10 is positioned on the proceeding direction of the laser beam (for example, the first laser beam L1 or the second laser beam L2), the inspection object 10 may reflect or scatter the laser beam. In this case, the detector (for example, the first detector 300 or the second detector 400) may detect the laser beam reflected or scattered from the inspection object 10.

In such an embodiment, when the height of the inspection object 10 from the top surface of the stage ST is equal to or greater than the minimum allowable specification LL, the first detector 300 may detect the first laser beam L1 reflected or scattered from the inspection object 10. In this case, in the laser inspection system SYS1 of the disclosure, when the first detector 300 detects the first laser beam L1 reflected or scattered from the inspection object 10, it may be determined that the specification of the inspection object 10 is greater than the minimum allowable specification LL.

In such an embodiment, when the height of the inspection object 10 from the top surface of the stage ST is equal to or greater than the maximum allowable specification UL, the second detector 400 may detect the second laser beam L2 reflected or scattered from the inspection object 10. In this case, in the laser inspection system SYS1 of the disclosure, when the second detector 400 detects the second laser beam L2 reflected or scattered from the inspection object 10, it may be determined that the specification of the inspection object is greater than the maximum allowable specification UL.

In such an embodiment, when the first detector 300 detects the first laser beam L1 reflected or scattered from the inspection object 10, and the second detector 400 does not detect the second laser beam L2 reflected or scattered from the inspection object 10, the inspection object 10 may be determined as a good (or normal) product finally.

In such an embodiment, when the first detector 300 does not detect the first laser beam L1 reflected or scattered from the inspection object 10, or the second detector 400 detects the second laser beam L2 reflected or scattered from the inspection object 10, the inspection object 10 may be determined as a defective product finally.

Figure 3:
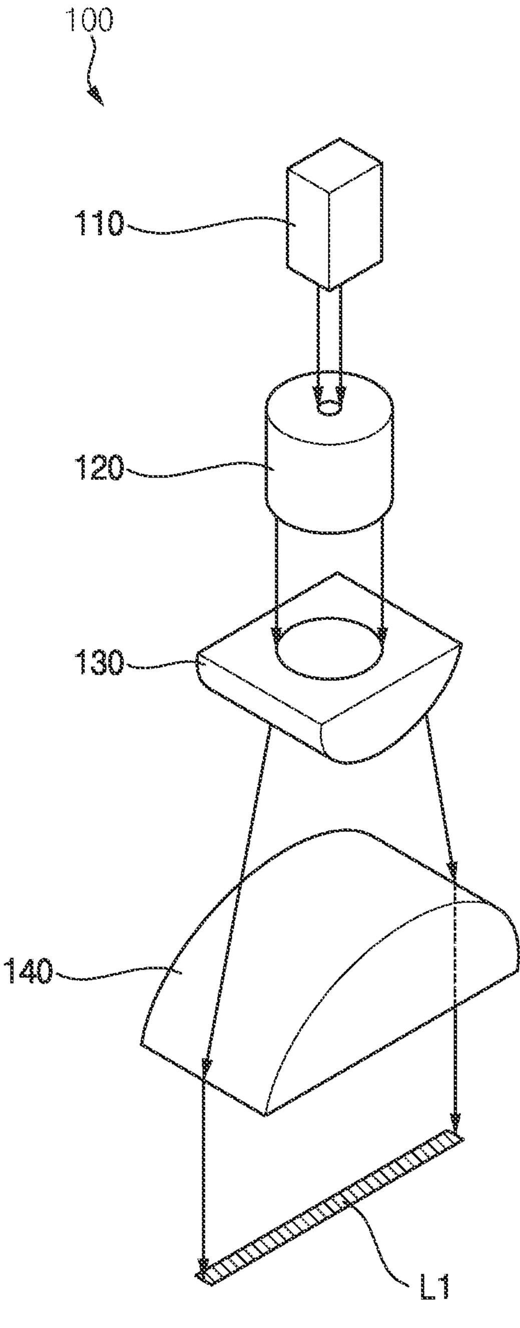
FIG. 3 is a perspective view showing an embodiment of a laser unit included in the laser inspection system of FIG. 1.

FIG. 3 is a perspective view showing an embodiment of a laser unit included in the laser inspection system of FIG. 1. Particularly, FIG. 3 may be a perspective view showing an embodiment of the first laser unit 100 included in the laser inspection system SYS1 of FIG. 1.

Referring to FIG. 3, an embodiment of the first laser unit 100 may include a light source 110, a laser expander 120, a laser slitter 130, and a collimated laser slitter 140.

Although not shown in FIG. 3, the second laser unit 200 may also have the same structure as the first laser unit 100.

The light source 110 may generate a source laser and emit the source laser toward the laser expander 120.

The laser expander 120 may be disposed below the light source 110. The laser expander 120 may expand the source laser emitted from the light source 110. The laser expander 120 may expand the source laser to an area corresponding to an area of the inspection object 10.

The laser slitter 130 may be disposed below the laser expander 120. The laser slitter 130 may slit the source laser expanded through the laser expander 120 in a straight line. The source laser passed through the laser slitter 130 may have a different incident angle according to each position.

The collimated laser slitter 140 may be disposed below the laser slitter 130. The collimated laser slitter 140 may allow the source laser passed through the laser slitter 130 to have the same incident angle at all positions. In such an embodiment, the source laser passed through the collimated laser slitter 140 may be parallel at all positions. Accordingly, the first laser beam L1 may be emitted in parallel from the first laser unit 100.

FIGS. 4, 5, 6, 7, 8, 9 and 10 are views showing the laser inspection system of FIG. 1.

Figure 4:
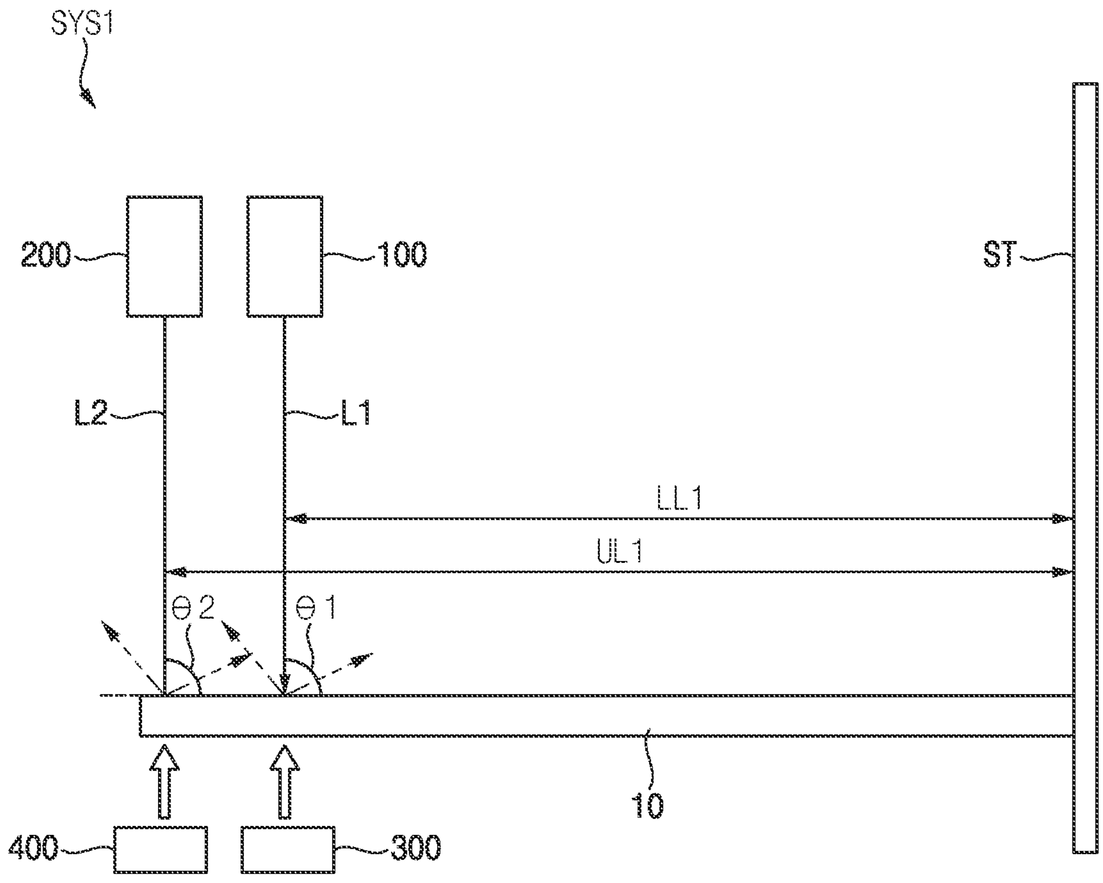
FIGS. 4, 5, 6, 7, 8, 9 and 10 are views showing the laser inspection system of FIG. 1.
Figure 4:
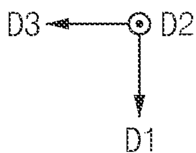
Figure 5:
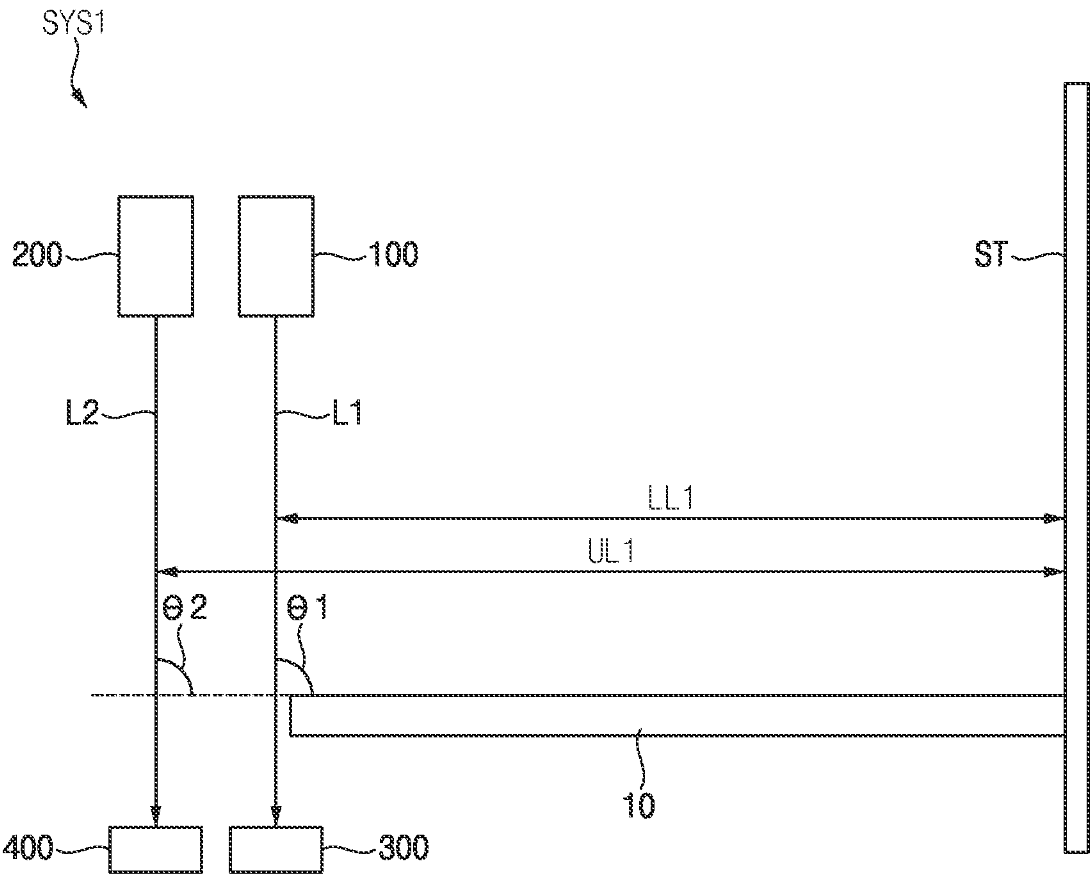
Figure 5:
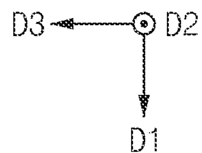
Figure 6:
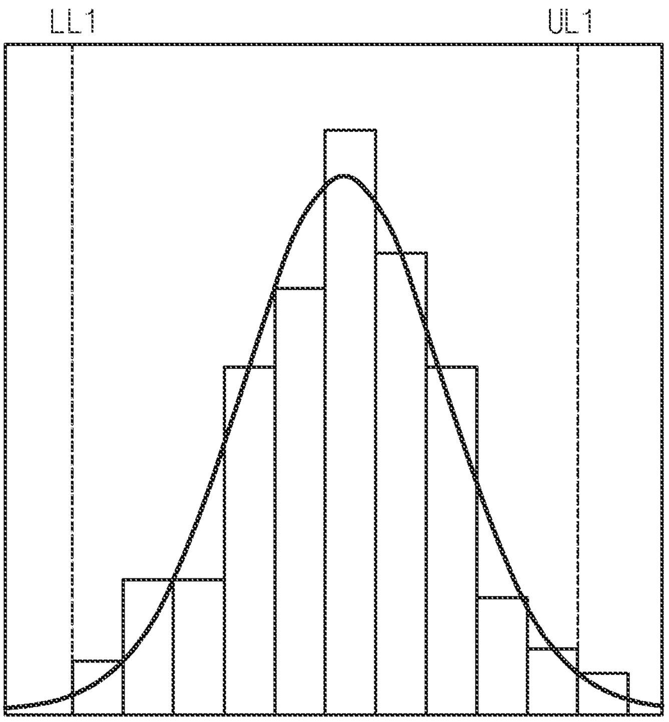

FIGS. 4, 5 and 6 are views showing an embodiment in which the minimum allowable specification LL of the inspection object 10 is a first minimum allowable specification LL1, and the maximum allowable specification UL of the inspection object 10 is a first maximum allowable specification UL1.

Referring to FIG. 4, the height of the inspection object 10 from the top surface of the stage ST may exceed the first maximum allowable specification UL1.

The first laser beam L1 may be radiated to a position of the first minimum allowable specification LL1 of the inspection object 10, and the second laser beam L2 may be radiated to a position of the first maximum allowable specification UL1 of the inspection object 10. The first laser beam L1 may be radiated while having the first angle θ1 with respect to the inspection object 10, and the second laser beam L2 may be radiated while having the second angle θ2 with respect to the inspection object 10. In an embodiment, for example, the first laser beam L1 and the second laser beam L2 may be radiated perpendicularly to the inspection object 10.

Since the height of the inspection object 10 from the top surface of the stage ST exceeds the first maximum allowable specification UL1, the first laser beam L1 may be reflected or scattered from the inspection object 10, and the second laser beam L2 may also be reflected or scattered from the inspection object 10.

In this case, the first detector 300 may detect the first laser beam L1 reflected or scattered from the inspection object 10, and the second detector 400 may also detect the second laser beam L2 reflected or scattered from the inspection object 10. Accordingly, the inspection object 10 may be determined as a defective product.

Referring to FIG. 5, unlike FIG. 4, the height of the inspection object 10 from the top surface of the stage ST may be smaller than the first minimum allowable specification LL1.

The first laser beam L1 may be radiated to the position of the first minimum allowable specification LL1 of the inspection object 10, and the second laser beam L2 may be radiated to the position of the first maximum allowable specification UL1 of the inspection object 10. The first laser beam L1 may be radiated while having the first angle θ1 with respect to an extension line of the inspection object 10 in the third direction D3 (e.g., an imaginary line extending from the inspection object 10 in the third direction D3), and the second laser beam L2 may be radiated while having the second angle θ2 with respect to the extension line of the inspection object 10. In an embodiment, for example, the first laser beam L1 and the second laser beam L2 may be radiated perpendicularly to the extension line of the inspection object 10.

Since the height of the inspection object 10 from the top surface of the stage ST is smaller than the first minimum allowable specification LL1, the first laser beam L1 may not be reflected or scattered from the inspection object 10, and the second laser beam L2 may also not be reflected or scattered from the inspection object 10.

In this case, the first detector 300 may not detect the first laser beam L1 reflected or scattered from the inspection object 10, and the second detector 400 may also not detect the second laser beam L2 reflected or scattered from the inspection object 10. Accordingly, the inspection object 10 may be determined as a defective product.

FIG. 6 is a graph showing a number distribution of good products of the inspection object 10 that may be acquired by the laser inspection system SYS1. In the graph shown in FIG. 6, the x-axis may signify the specification of the inspection object 10, and the y-axis may signify the number of inspection objects 10.

As shown in FIG. 6, the inspection object 10 may have various specifications. In an embodiment, for example, the inspection object 10 may have a specification between the first minimum allowable specification LL1 and the first maximum allowable specification UL1.

In such an embodiment, the number distribution of the inspection object 10 having the specification between the first minimum allowable specification LL1 and the first maximum allowable specification UL1 may correspond to a normal distribution.

Figure 7:
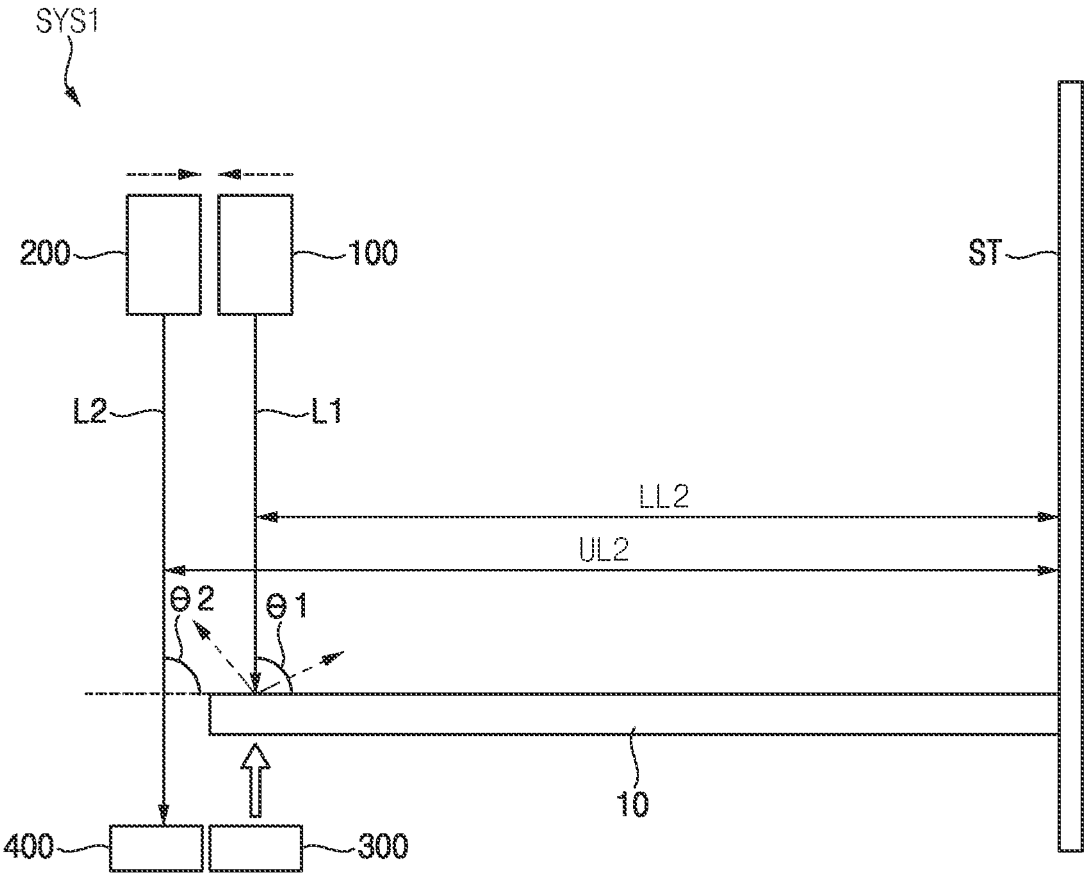
Figure 7:
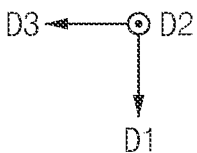
Figure 8:
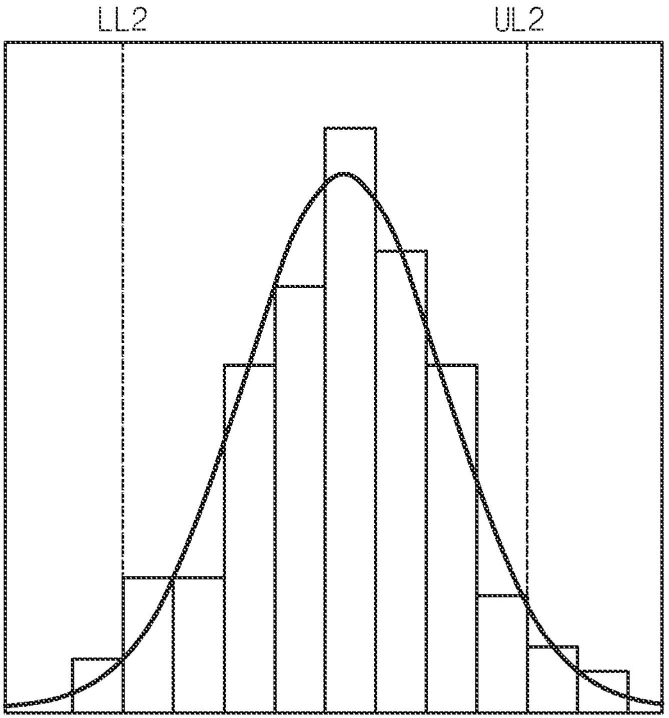

FIGS. 7 and 8 are views showing an embodiment in which the minimum allowable specification LL of the inspection object 10 is a second minimum allowable specification LL2, and the maximum allowable specification UL of the inspection object 10 is a second maximum allowable specification UL2.

Referring to FIGS. 4 and 7, a value obtained by subtracting the first minimum allowable specification LL1 from the first maximum allowable specification UL1 may be greater than a value obtained by subtracting the second minimum allowable specification LL2 from the second maximum allowable specification UL2. In an embodiment, for example, the first maximum allowable specification UL1 may be greater than the second maximum allowable specification UL2, and the first minimum allowable specification LL1 may be smaller than the second minimum allowable specification LL2.

In such an embodiment, the maximum allowable specification UL and the minimum allowable specification LL, which are specifications for determining whether the inspection object 10 is good or not, may be set to have various values. In this case, the maximum allowable specification UL and the minimum allowable specification LL may be set by positions of the first laser unit 100 and the second laser unit 200. In an embodiment, for example, as shown in FIG. 7, the first laser unit 100 and the second laser unit 200 may be disposed to be adjacent to each other, so that a difference between the maximum allowable specification UL and the minimum allowable specification LL may be set small.

When the inspection object 10 has a specification between the second minimum allowable specification LL2 and the second maximum allowable specification UL2, the inspection object 10 may be determined as a good product. In an embodiment, the first laser beam L1 may be radiated to a position of the second minimum allowable specification LL2 of the inspection object 10, and the second laser beam L2 may be radiated to a position of the second maximum allowable specification UL2 of the inspection object 10.

Referring to FIGS. 6 and 8, a value obtained by subtracting the first minimum allowable specification LL1 from the first maximum allowable specification UL1 is set to be greater than a value obtained by subtracting the second minimum allowable specification LL2 from the second maximum allowable specification UL2, and accordingly, the spread of the graph showing the number distribution of good products according to the specification of the inspection object 10 may be reduced. In such an embodiment, the spread on the specification of the inspection object 10 may be adjusted according to the arrangement of the first laser unit 100 and the second laser unit 200.

Figure 9:
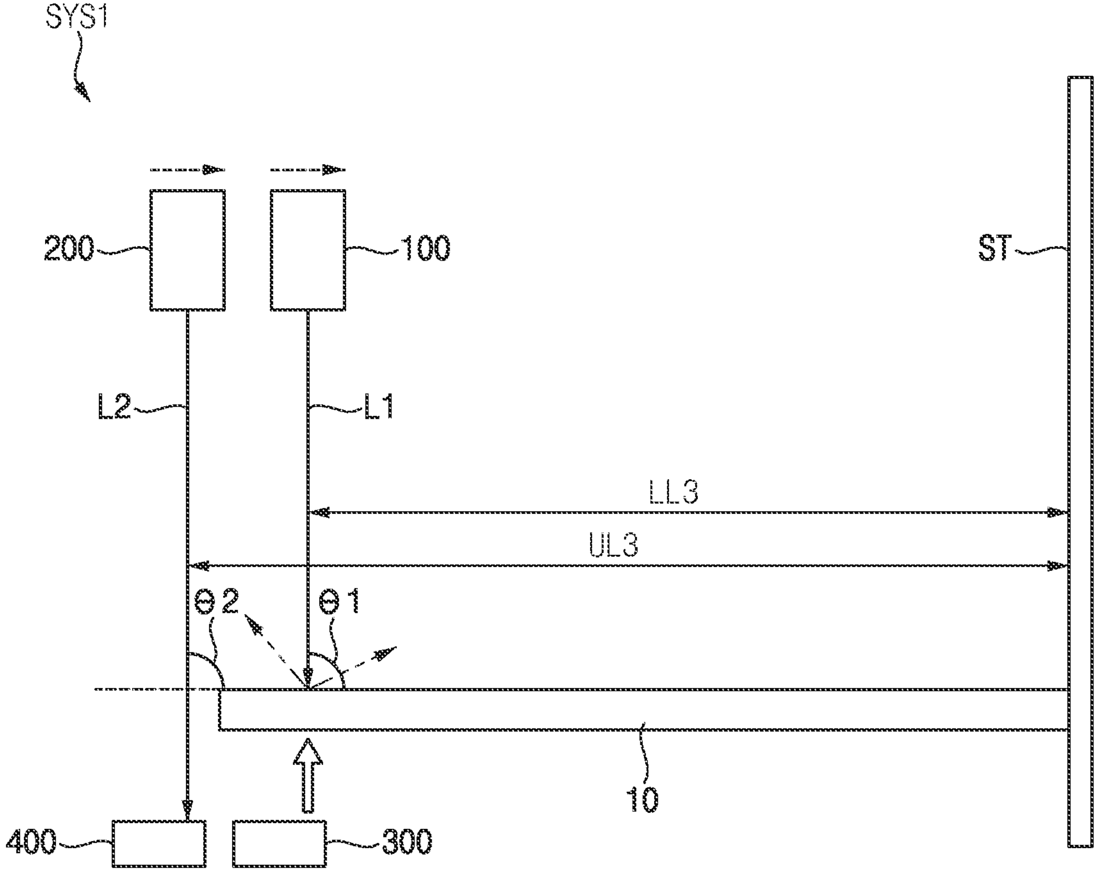
Figure 9:
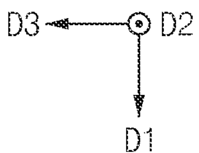
Figure 10:
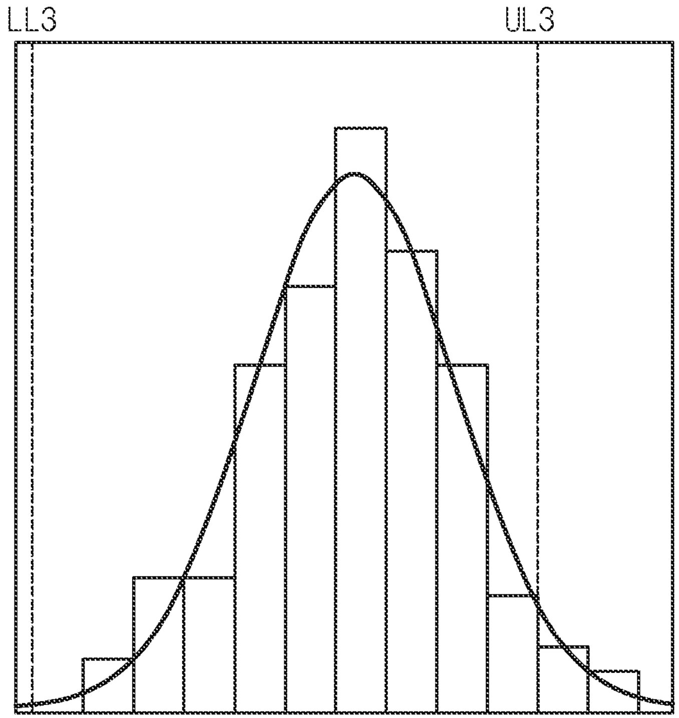

FIGS. 9 and 10 are views showing an embodiment in which the minimum allowable specification LL of the inspection object 10 is a third minimum allowable specification LL3, and the maximum allowable specification UL of the inspection object 10 is a third maximum allowable specification UL3.

Referring to FIGS. 4 and 9, the first maximum allowable specification UL1 may be greater than the third maximum allowable specification UL3, and the first minimum allowable specification LL1 may also be greater than the third minimum allowable specification LL3. In an embodiment, for example, as shown in FIG. 9, each of the first laser unit 100 and the second laser unit 200 may be moved and disposed in a direction opposite to the third direction D3.

When the inspection object 10 has the specification between the third minimum allowable specification LL3 and the third maximum allowable specification UL3, the inspection object 10 may be determined as a good product. In an embodiment, the first laser beam L1 may be radiated to a position of the third minimum allowable specification LL3 of the inspection object 10, and the second laser beam L2 may be radiated to a position of the third maximum allowable specification UL3 of the inspection object 10.

Referring to FIGS. 6 and 10, the first maximum allowable specification UL1 is set to be greater than the third maximum allowable specification UL3, and the first minimum allowable specification LL1 is set to be greater than the third minimum allowable specification LL3, and accordingly, a center of the graph showing the number distribution of good products according to the specification of the inspection object 10 may be moved in a direction having a relatively small value. In such an embodiment, the center of the specification of the inspection object 10 may be adjusted according to the arrangement of the first laser unit 100 and the second laser unit 200.

Conventionally, the inspection object is directly moved to a specification measurement stage by an inspector, the specification is measured by a measuring device, and then the measured specification is compared with the allowable specification to distinguish a good product, such that a defective product may not be immediately confirmed and a process capability may not be managed.

In the laser inspection system SYS1 according to an embodiment of the disclosure, the first laser beam L1 emitted from the first laser unit 100 may be radiated to the minimum allowable specification LL, and the second laser beam L2 emitted from the second laser unit 200 may be radiated to the maximum allowable specification UL. In such an embodiment, a defect in specification may be immediately checked depending on whether the first and second laser beams L1 and L2 are reflected or scattered from the inspection object 10, such that inspection efficiency may be improved. Accordingly, since logistics may be automated, errors may be reduced, so that yield may be increased, and inspection time may be shortened. In addition, the specification distribution and the specification center may be adjusted by arranging each of the first and second laser units 100 and 200, so that the process capability may be easily managed.

Figure 11:
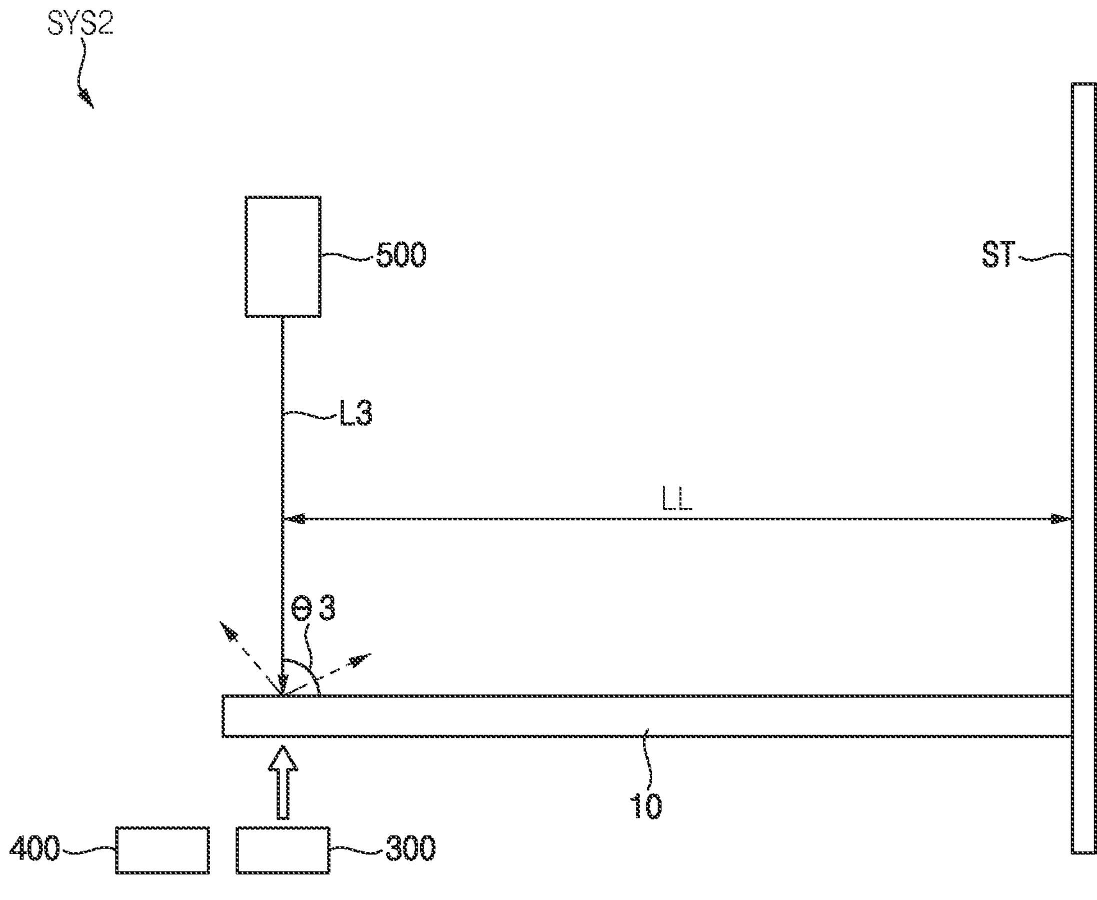
FIGS. 11 and 12 are views showing a laser inspection system according to an alternative embodiment of the disclosure.
Figure 11:
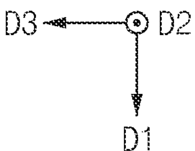
Figure 12:
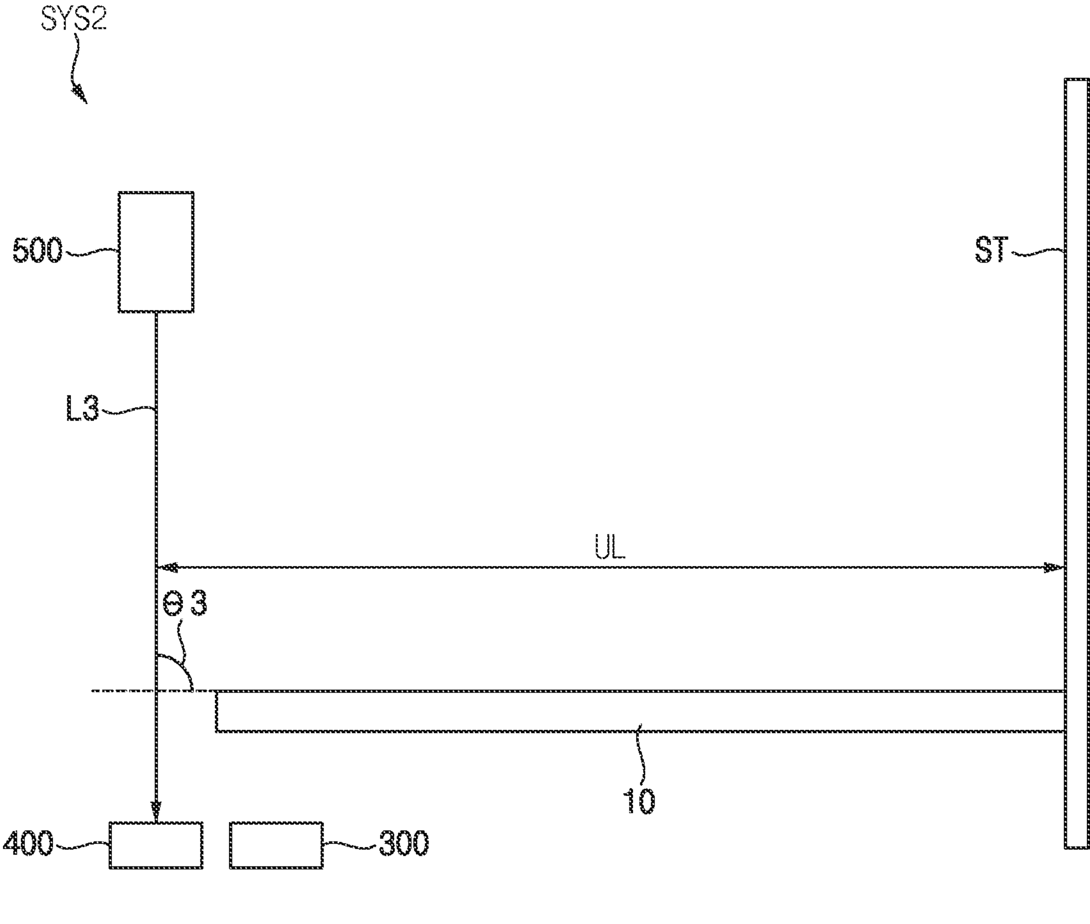
Figure 12:
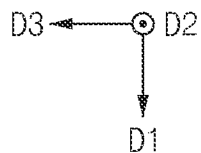

FIGS. 11 and 12 are views showing a laser inspection system according to an alternative embodiment of the disclosure.

Referring to FIGS. 11 and 12, an embodiment of a laser inspection system SYS2 may include the stage ST, a laser unit 500, the first detector 300, the second detector 400, and the inspection object 10.

An embodiment of the laser inspection system SYS2 described with reference to FIGS. 11 and 12 may be substantially the same as or similar to the embodiment of the laser inspection system SYS1 described with reference to FIG. 1, except for the laser unit 500.

The laser unit 500 may be spaced apart from the stage ST in the third direction D3. The laser unit 500 may emit a laser beam L3 proceeding in the direction parallel to the plane. In an embodiment, the laser beam L3 may proceed in the first direction D1. In an embodiment, the laser beam L3 may be a laser slit light in a form of a straight line.

The first detector 300 may be spaced apart from the laser unit 500 in the first direction D1 (see FIG. 11). In an embodiment, the first detector 300 may be disposed on the proceeding direction of the laser beam L3. In an embodiment, the first detector 300 may detect a reflected or scattered laser beam L3.

The second detector 400 may be spaced apart from the first detector 300 in the third direction D3, and may be spaced apart from the laser unit 500 in the first direction D1 (see FIG. 12). In an embodiment, the second detector 400 may be disposed on the proceeding direction of the laser beam L3. In an embodiment, the second detector 400 may detect a reflected or scattered laser beam L3.

In an embodiment, as shown in FIG. 11, the laser unit 500 may be disposed on a position of the minimum allowable specification LL of the inspection object 10. In this case, the laser beam L3 may be radiated to the position of the minimum allowable specification LL of the inspection object 10.

In such an embodiment, as shown in FIG. 12, the laser unit 500 may be moved and disposed on a position of the maximum allowable specification UL of the inspection object 10. In this case, the laser beam L3 may be radiated to the position of the maximum allowable specification UL of the inspection object 10.

The laser beam L3 may be radiated while having a third angle θ3 with respect to each of the inspection object 10 or the extension line of the inspection object 10 in the third direction D3. In an embodiment, for example, the laser beam L3 may be radiated perpendicularly to each of the inspection object 10 or the extension line of the inspection object 10 in the third direction D3. In such an embodiment, the third angle θ3 may be about 90°.

In an embodiment, the height of the inspection object 10 from the top surface of the stage ST may be greater than the minimum allowable specification LL and smaller than the maximum allowable specification UL. The laser beam L3 may be reflected or scattered from the inspection object 10 at the position of the minimum allowable specification LL, and may not be reflected or scattered from the inspection object 10 at the position of the maximum allowable specification UL.

In this case, the first detector 300 may detect the laser beam L3 reflected or scattered from the inspection object 10, and the second detector 400 may not detect the laser beam L3 reflected or scattered from the inspection object 10. Accordingly, the inspection object 10 may be determined as a good (or normal) product.

The disclosure can be applied to inspection systems of various display devices such as inspection systems of display devices for vehicles, ships and aircraft, portable communication devices, display devices for exhibition or information transmission, medical display devices, or the like, for example.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A laser inspection system comprising:

a stage including a top surface parallel to a plane defined by a first direction and a second direction intersecting the first direction;

a first laser unit spaced apart from the stage in a third direction perpendicular to the plane, wherein the first laser unit emits a first laser beam proceeding in a direction parallel to the first direction, and the first laser beam is a laser slit light in a form of a straight line;

a second laser unit spaced apart from the first laser unit in the third direction directed to the first laser unit from the stage, wherein the second laser unit emits a second laser beam proceeding in a direction parallel to the first direction, and the second laser beam is a laser slit light in a form of a straight line;

an inspection object spaced apart from the first laser unit in the first direction on the top surface of the stage, wherein the inspection object has a maximum allowable specification and a minimum allowable specification in the third direction from the top surface of the stage; and a first detector spaced apart from the first laser unit in the first direction and disposed on the proceeding direction of the first laser beam, wherein the first detector detects the first laser beam scattered from the inspection object, wherein the inspection object is a cover glass having a thickness in the first direction, and the inspection object is disposed between the first laser unit and the first detector when viewed in the third direction, and wherein the minimum allowable specification is defined as a minimum allowable height of the inspection object from the top surface of the stage in the third direction, and the maximum allowable specification is defined as a maximum allowable height of the inspection object from the top surface of the stage in the third direction.

2. The laser inspection system of claim 1, wherein the first laser beam is radiated to a position of the minimum allowable specification of the inspection object, and the second laser beam is radiated to a position of the maximum allowable specification of the inspection object.

3. The laser inspection system of claim 1, further comprising:

a second detector spaced apart from the second laser unit in the first direction and disposed on a proceeding direction of the second laser beam, wherein the first detector is spaced apart from the stage in the third direction, and the second detector is spaced apart from the first detector in the third direction.

4. The laser inspection system of claim 1, wherein, when a height of the inspection object from the top surface of the stage is greater than or equal to the minimum allowable specification, the first detector detects the first laser beam scattered from the inspection object.

5. The laser inspection system of claim 1, wherein, when a height of the inspection object from the top surface of the stage is greater than or equal to the maximum allowable specification, the second detector detects the second laser beam scattered from the inspection object.

6. The laser inspection system of claim 1, wherein the first laser unit and the second laser unit simultaneously emit the first laser beam and the second laser beam, respectively.

7. The laser inspection system of claim 1, wherein each of the first laser unit and the second laser unit includes a light source and a laser slitter.

8. The laser inspection system of claim 1, wherein the first laser beam and the second laser beam have different colors from each other.

9. A laser inspection system comprising:

a stage including a top surface parallel to a plane defined by a first direction and a second direction intersecting the first direction;

a laser unit spaced apart from the stage in a third direction perpendicular to the plane, wherein the laser unit emits a laser beam proceeding in a direction parallel to the first direction, and the laser beam is a laser slit light in a form of a straight line;

an inspection object spaced apart from the laser unit in the first direction on the top surface of the stage, wherein the inspection object has a maximum allowable specification and a minimum allowable specification in the third direction from the top surface of the stage; and a detector spaced apart from the laser unit in the first direction and disposed on a proceeding direction of the laser beam, wherein the detector detects the laser beam scattered from the inspection object, wherein the inspection object is a cover glass having a thickness in the first direction, and the inspection object is disposed between the laser unit and the detector when viewed in the third direction, and wherein the minimum allowable specification is defined as a minimum allowable height of the inspection object from the top surface of the stage in the third direction, and the maximum allowable specification is defined as a maximum allowable height of the inspection object from the top surface of the stage in the third direction.

10. The laser inspection system of claim 9, wherein the laser beam is radiated to a position of the minimum allowable specification of the inspection object.

11. The laser inspection system of claim 10, wherein the laser beam is radiated to a position of the maximum allowable specification of the inspection object.

12. A laser inspection method comprising:

preparing for a first laser unit which emits a first laser beam, a second laser unit spaced apart from the first laser unit and which emits a second laser beam, a first detector disposed on a proceeding direction of the first laser beam and which detects the first laser beam scattered, a second detector spaced apart from the first detector, disposed on a proceeding direction of the second laser beam and which detects the second laser beam scattered, and an inspection object disposed between the first laser unit and the first detector and having a maximum allowable specification and a minimum allowable specification, wherein the inspection object is a cover glass having a thickness in the first direction and disposed between the first laser unit and the first detector when viewed in a third direction, the first laser beam is a laser slit light in a form of a straight line, the second laser beam is a laser slit light in a form of a straight line, the minimum allowable specification is defined as a minimum allowable height of the inspection object from the top surface of the stage in the third direction, and the maximum allowable specification is defined as a maximum allowable height of the inspection object from the top surface of the stage in the third direction;

radiating the first laser beam to a position of the minimum allowable specification of the inspection object;

radiating the second laser beam to a position of the maximum allowable specification of the inspection object;

detecting, by the first detector, the first laser beam scattered from the inspection object;

detecting, by the second detector, the second laser beam scattered from the inspection object; and determining whether the inspection object has a specification defect, based on the first laser beam and the second laser beam which are detected by the first detector and the second detector.

13. The laser inspection method of claim 12, wherein the determining whether the inspection object has the specification defect includes determining the inspection object as a defective product when the second detector detects the second laser beam scattered from the inspection object.

14. The laser inspection method of claim 13, wherein the determining whether the inspection object has the specification defect includes determining the inspection object as a normal product when the first detector detects the first laser beam scattered from the inspection object.

15. The laser inspection method of claim 12, wherein the radiating the first laser beam to the position of the minimum allowable specification of the inspection object, and the radiating the second laser beam to the maximum allowable specification position of the inspection object are simultaneously performed.

16. The laser inspection method of claim 12, wherein each of the first laser beam and the second laser beam is radiated perpendicularly to the inspection object or an extension line of the inspection object.

17. The laser inspection method of claim 12, wherein each of the first laser unit and the second laser unit includes a light source and a laser slitter.

* * * * *